(No Model.) 4 Sheets—Sheet 1.

A. P. MARBLE & G. W. KNAPP.
PURIFYING AND AERATING PLANT FOR THE FILTRATION AND TREATMENT OF SEWAGE AND WATER IN BROOKS OR COURSES.

No. 366,333. Patented July 12, 1887.

(No Model.) 4 Sheets—Sheet 4.

A. P. MARBLE & G. W. KNAPP.
PURIFYING AND AERATING PLANT FOR THE FILTRATION AND TREATMENT OF SEWAGE AND WATER IN BROOKS OR COURSES.

No. 366,333. Patented July 12, 1887.

WITNESSES.
INVENTORS.

UNITED STATES PATENT OFFICE.

ALBERT P. MARBLE AND GEORGE W. KNAPP, OF WORCESTER, MASSACHUSETTS.

PURIFYING AND AERATING PLANT FOR THE FILTRATION AND TREATMENT OF SEWAGE AND WATER IN BROOKS OR COURSES.

SPECIFICATION forming part of Letters Patent No. 366,333, dated July 12, 1887.

Application filed June 10, 1886. Serial No. 204,702. (No model.)

*To all whom it may concern:*

Be it known that we, ALBERT P. MARBLE and GEORGE W. KNAPP, both citizens of the United States, residing at Worcester, in the county of Worcester and State of Massachusetts, have invented certain new and useful Improvements in Purifying and Aerating Plants for the Filtration and Treatment of Sewage and Water in Brooks or Courses, of which the following, together with the accompanying drawings, is a specification sufficiently full, clear, and exact to enable persons skilled in the art to which this invention appertains to make and use the same.

The objects of our present invention are to provide a system and apparatus for the filtration and treatment of sewage or the water in water-courses and streams that can be practically and economically worked on an extensive scale; to afford facilities for the separation and disposal of the accumulated matter of the sewage or water and the convenient removal of the sludge; to provide for the easy renewal of the filtering-beds; to afford means for the aeration of the sewage or water after filtration, and also for the return of the drip and washings to the primary basin or reservoir, and to render the construction such that it can be conveniently protected from the weather. These objects we attain by the system and the apparatus herein illustrated and described, the particular subject-matter claimed being hereinafter specified.

Figure 1:
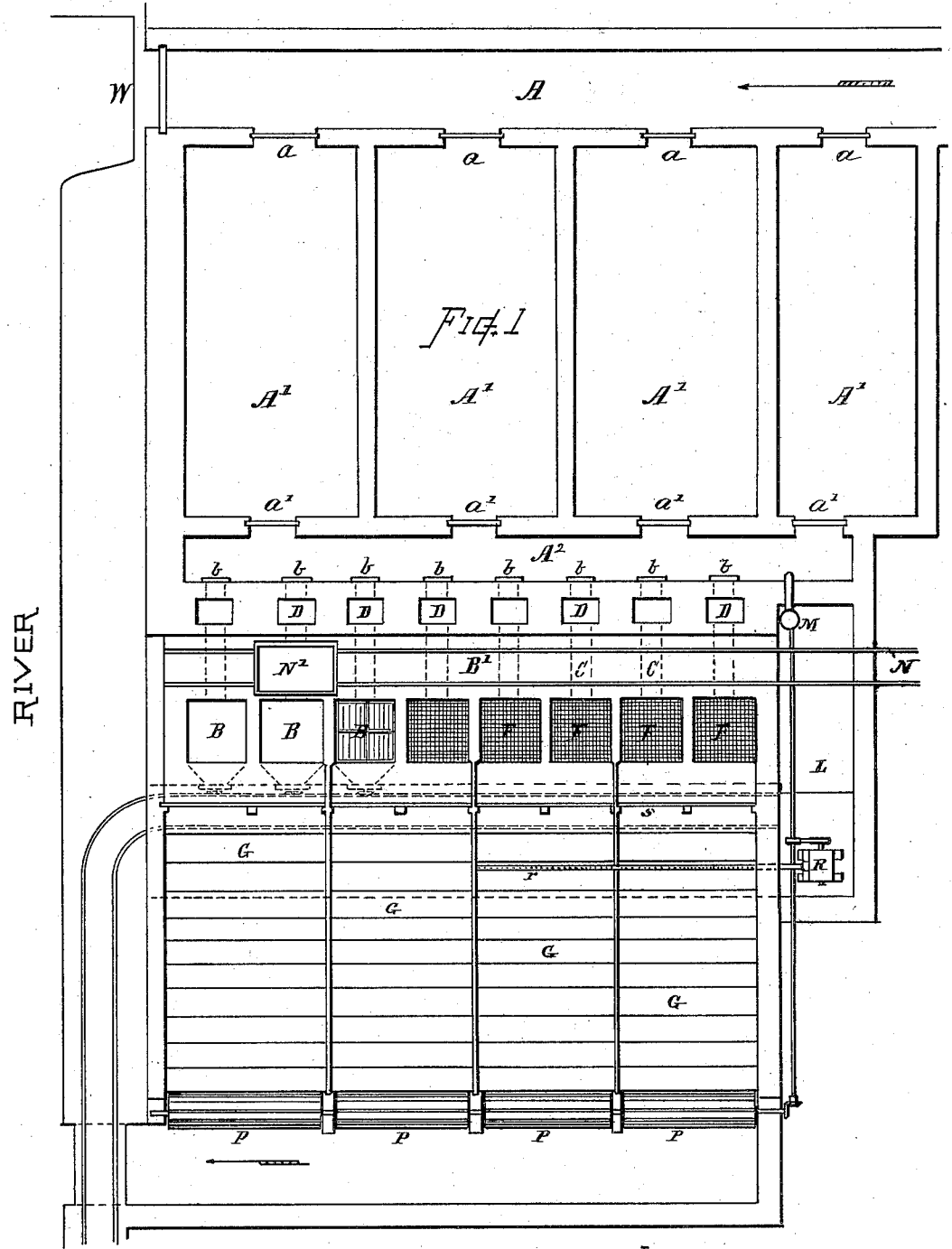
Figure 2:
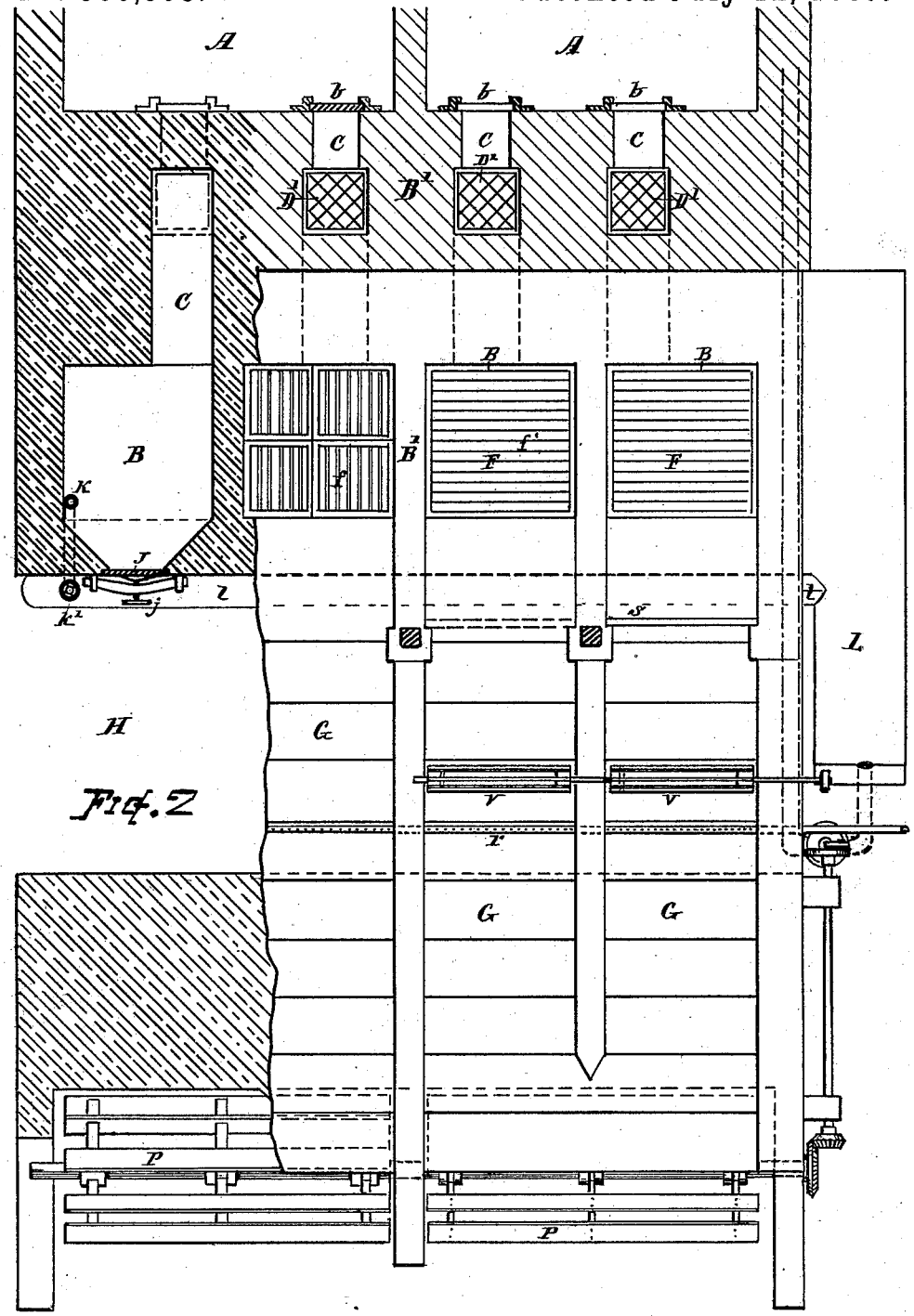
Figure 3:
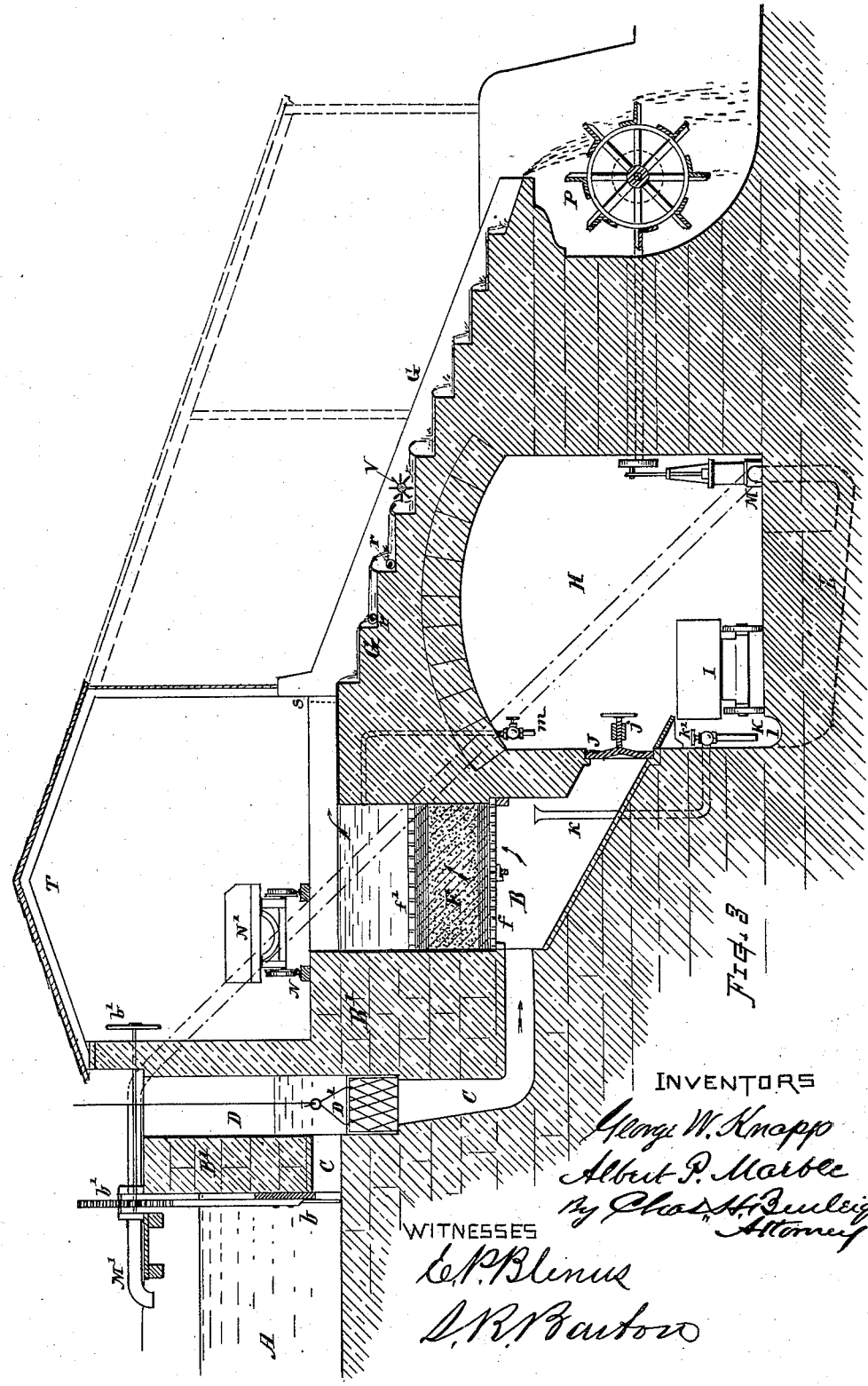
Figure 4:
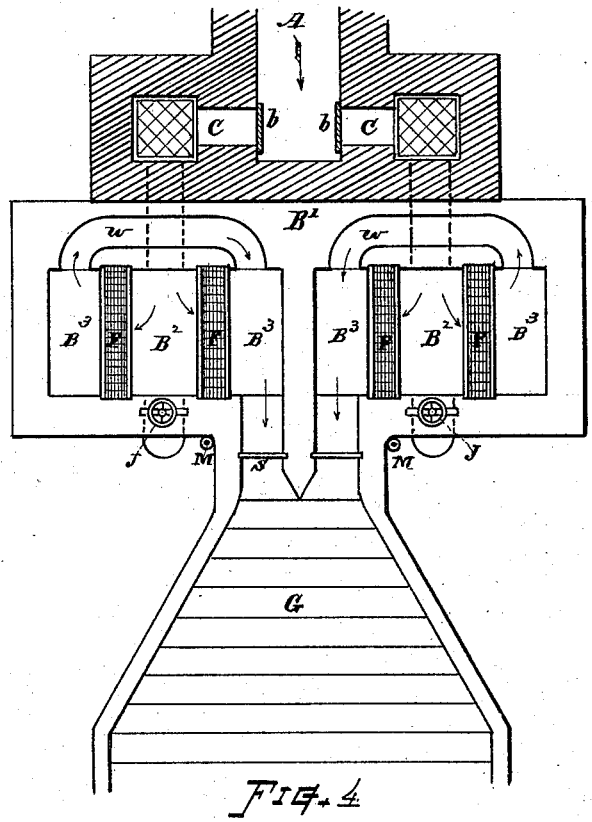
Figure 5:
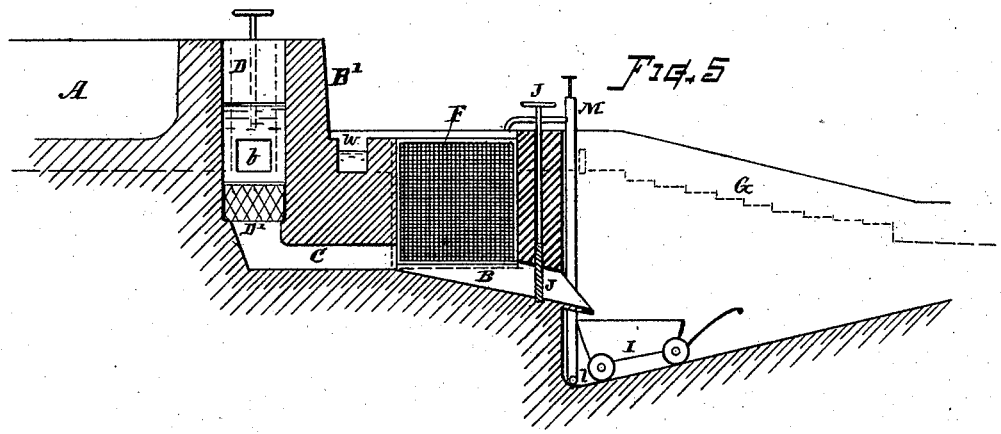

In the drawings, Figure 1 is a plan view illustrating the nature of our invention. Fig. 2 is a part plan, part section, drawn to a somewhat larger scale. Fig. 3 is a vertical section of the same. Fig. 4 is a plan view showing a modified form of the invention; and Fig. 5 is a vertical section at line $x$ $x$ on Fig. 4.

In our improved system as adapted for the treatment and disposal of sewage the plant is arranged at some convenient location at the outlet of the main channel or conduit—as, for instance, where said conduit empties into a river or water-course—and preferably at a position where there is a moderate fall or variation in level of the ground; or, in the absence of fall, difference in levels can be attained by pumping the sewage to an elevated basin or reservoir.

The sewage to be treated, after having been allowed to stand for a time in large settling-basins or direct from the main conduit, is conducted through passages in which are arranged coarse gratings or basket-screens for collecting dead animals and other large floating substances, and thence into chambers containing filtering material, said chambers having space and facilities for the collection and ready removal of the sludge. After filtration is effected the water is subjected to aerating action by agitation in contact with the air, and, where the nature of the site will permit, the flow of water is utilized as a means of power for working mechanical appliances, as pumps, for returning the drip and washings to the primary basin, or for compressing air to assist the aerating action, or for such other purposes as may be found desirable and convenient.

Suitable gates are provided for shutting off the flow to the various deposit-chambers, and the collecting gratings or baskets are arranged for convenient removal, while the sludge-deposit chambers are made in a manner to facilitate the convenient withdrawal of their contents into cars or receptacles to be carted away, separately or in connection with the mass of material employed for filtering, the filters being arranged so that the material can be dumped at such times as may be deemed necessary, all of which is hereinafter more definitely and in detail described.

Referring to the drawings, A denotes the main conduit or channel for the delivery of the sewage or water to be treated.

A' indicates settling basins or reservoirs, each of which may be of a size sufficient for containing the flow for a single day, more or less, and wherein the water is allowed to stand and settle, said basins being alternately drawn off and refilled in the process of treatment, as required.

B' indicates a dam or structure provided with filtering and sludge-collecting chambers, and having pipes or conduits C, leading into the same from the main conduit A or its auxiliary $A^2$, said pipes C being provided with a gate, b, for independently shutting off the flow into the respective chambers B when desired. A series of these chambers, conduits, and gates are employed, consisting of two or more, according to the extent of the works and quantity of sewage to be treated. The several chambers and appurtenances being of similar construction and arrangement, it will be sufficient to describe one of them in detail.

A series of wells, D, are arranged in the upper part of the dam, which respectively communicate with the passages or conduits C, within which wells we arrange removable catch baskets or gratings D', formed of comparatively coarse wire-netting or equivalent material, the meshes whereof are sufficiently close to prevent the passage of dead rats, cats, or other floating substances of moderately large size. These baskets are located just below the gates b, and are provided with facilities for conveniently lifting them out from the wells for discharging their contents as often as may be necessary. The gates b are furnished with mechanism, b', whereby they can be readily opened and closed.

F indicates the filter-beds, which may be, say, six feet square, more or less, preferably disposed for upward filtration, and composed of any suitable material—as, for instance, a layer of straw supported upon a suitable grating, f, and a body of sand or earth above the straw, then another layer of straw and a weighted grating, f', upon the top for retaining the earth in place. The lower grating of the filter is preferably supported on removable chocks, or made in such manner that the filtering beds or pack can be conveniently dumped into the sludge-pocket at the lower part of the chamber when desired.

If desired, the filter-pack may be formed of asbestus felt or of any fibrous or granulated substance; but we consider that the earth and straw are as convenient and economical as anything for the purpose. The top of the filter-pack is some distance from the overflow-level of the well or chamber, so that a body of filtered liquid stands above the pack. The bottom of the filter well or chamber is made with a downward inclination, substantially as shown, and forms a pocket for the collection of the sludge.

From the top of the wells or chambers B a rollway, G, formed in a series of successive steps or offsets, leads down the incline, as illustrated. Beneath this rollway G is an arched passage or driveway, H, into which a car, I, can be run for receiving the sludge, which is withdrawn from the chambers or pockets, as hereinafter explained, through a suitable opening provided with a close-fitting gate or door, J, and then carted away and deposited at such place as desired.

The door J is in the present instance made similar to the door of a retort, and is provided with a support-bar and clamping-screw, j, for securing it in place, the adjoining faces of the door and its seat being fitted or provided with suitable packing in a manner to form a water-tight joint.

A pipe, K, having a suitable valve or cock, k', is provided for drawing off the water from the chamber B after the gate b has been closed. Said pipe discharges into a gutter or channel, l, that leads into a catch-basin, L, at convenient position, and from which the drip and washings can be pumped up by suitable pumping mechanism, M, and returned to the basin or conduit back of the filters.

m indicates a pipe leading from the upper part of the filter well or space above the filtering-bed down into the archway H, where it is provided with a suitable cock or nozzle for supplying water for washing down the walls, car, and pavements and cleaning up the mud and filth after removing the sludge and material from any of the chambers B.

N denotes a tramway passing along the top of the filter-wells, on which a car, N', may be run for conveying the stock and materials for renewing the filter-beds, as required.

P indicates a wheel or revolving fan located at the foot of the rollway, for the purpose of breaking up and aerating the stream of water, and also for supplying power for driving the pump M, or, if preferred, any other mechanism about the works.

The several steps of the rollway are preferably made so as to give a slight water-fall and basin to each of them, so that as the water flows over them it will mingle with the air in the most thorough manner. In some instances perforated pipes may be laid along the steps, as at r, through which air can be forced up through the flowing water by means of an air compressor or blower, R; or, again, a series of revolving fan-wheels can be arranged along the steps, as at V, and agitation of the water be effected by revolving said fan-wheel by applied power.

A line of flash-boards is to be arranged along the top of the rollway, as at S, when desired. The dam or portion of the plant containing the wells and filters is preferably inclosed and roofed in by a house or shed, T, which may be extended over the rollway G, if desired, and the plant thus protected from the weather, so that it can be operated and attended conveniently in winter or stormy weather without severe exposure of the laboring men.

When any of the filters become foul or clogged with matter, the filtering pack or bed F can be readily and conveniently removed and replaced by a new bed, the process of renewing the pack or bed being as follows: The gate b is closed to shut off the supply of sewage or water entering the chamber. The liquid in the chamber and passages is then drawn off by means of a pipe, K. The discharge-door J is then opened and the sludge drawn from the chamber into the car I. The chocks or devices which support the gratings F beneath the filter-bed are then released and the filter-bed dumped into the sludge-pocket and withdrawn through the door, to be carted away in the same manner as the sludge. The gratings F are then replaced and a new filter pack or bed is formed thereon by means of material brought in on the car N', which car and its tramway are preferably arranged so that the contents of the car can be dumped directly into either of the several filter wells or chambers B, as desired.

In Fig. 1 we show a series of settling-basins A', with the main conduit at one side and an auxiliary conduit, A², at the other, from which latter the filtering system draws its supply, gates $a$ and $a'$ being arranged so that the basins can be alternately filled and drawn off, as may be desired. In this arrangement it may be understood that the basins A' would be level with or below the main conduit, and that the auxiliary A² and system of filters would be arranged at a sufficiently lower level to drain off the contents from the respective basins. At the foot of the main conduit A is a rollway, W, which may be provided with flash-boards or gates for letting the water flow direct into the river in time of storms, floods, or high water.

In Figs. 4 and 5 we have shown a modification of the apparatus adapted for employment in locations where it is inconvenient to obtain an amount of fall sufficient for the upward filtration, as above described. In this modified arrangement the sewage flows through the filter-beds laterally instead of upward, the filter-beds being set as partitions across the chamber or well B. The sludge is deposited in the compartment B² and the filtrate conducted from the compartments B³ to the rollway G. The outer compartments are shown as having channels or water-ways, $w$, leading around the filter-beds into the space B³, from which the rollway descends. In this form of our apparatus we have also shown the rollway-bed contracted in a manner to permit access to the discharge-doors J at either side of the embankment and by way of an incline sunk below the natural level of the surrounding surface.

Among the advantages incident to our improved system and apparatus herein described may be mentioned the following: The sludge can be conveniently removed without disturbing the filters; the filter packs or beds can be conveniently renewed when required; the sludge is kept separate from the filtering material, and the position of the filter in relation to the sludge-pocket and the direction of the flow is such as to give the best practical results, as the gravity of the matter and the flowing of the liquid into the chamber tend to keep the filtering-surface, as far as possible, free from accumulations.

The catch-baskets are conveniently disposed for handling and removal, and serve to keep the filters free from large deposits. The condition of the sludge deposit can be tested by opening the pipe K, so as tell when the deposited sludge should be drawn off. Any one of the filters can be cleansed or repaired independently of the others and without interfering with the working of the other filters in the series.

What we claim as of our invention, and desire to secure by Letters Patent, is—

1. The combination, with a sewer-conduit or water-course, of the dam or structure provided with chambers B, containing filter-beds, wells containing removable netting or catch-baskets, passages leading from the head of the dam through the catch-basket wells and into the lower part of the filter-chambers, stop-gates for said passages, and discharge gates or doors from the face of the dam into sludge-collecting spaces below the filters, substantially as and for the purpose set forth.

2. In combination with a sewer-conduit or water-course, the dam or structure having an open well or chamber, as B, a passage leading from the head of the dam into the lower part of said chamber, and provided with a stop-gate, an inclined rollway from the top of said chambers down the slope, an opening and door from the face of the dam into the bottom of said chamber, and a horizontally-disposed filter-bed across the central part of said chamber, as and for the purpose set forth.

3. The combination, with a sewer-conduit or water-course, of a dam or structure provided with a series of filter-chambers, as B, passages leading from the head of the dam into the respective chambers, and having gates for closing the same, filter-beds disposed within said chambers, with sludge-collecting space below said filter-beds and an overflow-space above, discharge-openings in the face of the dam leading into the sludge collecting spaces, and stop gates or doors closing the same, and a draining-pipe, K, substantially as and for the purposes set forth.

4. The combination, with the passage C, leading from the stop-gate to the filter-chamber B, of the removable catch-basket D', disposed in the well D, which forms a portion of said passage, substantially as and for the purpose set forth.

5. The combination of the filter-beds F, displaceable gratings above the sludge-pockets, supporting said filter-beds, the water-tight removable door J, the drain-pipe K, and cock $k'$, substantially as and for the purpose set forth.

6. The combination, with the dam or structure provided with a series of filter-chambers having discharge-doors, as at J, of the rollway G, provided with an archway, H, beneath the same, substantially as and for the purposes set forth.

7. The revolving fan-wheel P, combined with the filtering apparatus and stepped rollway, for the purposes set forth.

8. The combination of the filter F, the stepped rollway G, and the air-pipe $r$, for the purpose set forth.

9. The combination, with a sewer-conduit or water-course, of a series of settling-basins, an auxiliary waterway, a dam or structure provided with a series of chambers containing filtering-beds, passages leading from said waterway into the filter-chambers, gates for closing said passages, discharge-openings with stop-doors from the face of the dam to the sludge-collecting space beneath the filters, drain-pipes, and a stepped rollway inclining downward from the top of said filter-chambers, substantially as and for the purpose set forth.

Witness our hands this 2d day of June, A. D. 1886.

ALBERT P. MARBLE.
GEORGE W. KNAPP.

Witnesses:
CHAS. H. BURLEIGH,
ELLA P. BLENUS.